UNITED STATES PATENT OFFICE.

RICHARD M. STEPHENS, OF DENVER, COLORADO, ASSIGNOR TO JOHN M. WILSON, OF SAME PLACE.

INSECTICIDE.

SPECIFICATION forming part of Letters Patent No. 408,904, dated August 13, 1889.

Application filed April 23, 1889. Serial No. 308,301. (No specimens.)

*To all whom it may concern:*

Be it known that I, RICHARD M. STEPHENS, a citizen of the United States of America, residing at Denver, in the county of Arapahoe and State of Colorado, have invented a certain new and useful Insecticide, of which the following is a specification.

My invention relates to a new composition of matter intended more especially for the destruction of vermin and insects; and its objects are to furnish a composition readily and cheaply compounded, easily applied, and which shall be efficient and reliable, not only for the destruction of the life of vermin and insects, but also for the destruction of the eggs and of embryonic life; to which ends it consists in the composition more particularly hereinafter described and claimed.

The composition is formed of turpentine, kerosene or petroleum, ammonia, and carbolic acid, and in about the following proportions: turpentine, one-half gallon; kerosene, one gallon; water of ammonia, one pint; carbolic acid, two ounces.

Preferably the materials should be added each to the other in the order above given. The ammonia should be concentrated spirits, and the carbolic acid the commercially anhydrous or crystalline, that the composition may have the proper strength and penetrating effect to effect the best results in the destruction of vermin and insects and in destroying the life principle of the eggs thereof.

The composition may be applied by sprinkling or painting infected points or places, or by spraying, or be used as a wash. However applied or used, it forms a certain, speedy, and efficient insecticide and destroyer of vermin and their eggs.

I am aware that the use, in combination with other elements, of ammonia, turpentine, and oil of tar for a liniment is old; but such use was not with the same elements as herein recited nor for the same ends; hence such I do not claim; but What I do claim is—

The composition of matter for use as a destroyer of vermin and insects herein described, consisting of turpentine, kerosene, water of ammonia, and carbolic acid, substantially as set forth.

In testimony whereof I affix my signature in presence of two witnesses.

RICHARD M. STEPHENS.

Z. F. WILBER,
C. T. FINLAYSON.